(12) United States Patent
Blatter et al.

(10) Patent No.: US 11,105,383 B2
(45) Date of Patent: Aug. 31, 2021

(54) DRIVE TRAIN ARRANGEMENT FOR A MOTOR VEHICLE, AND METHOD FOR ADAPTING A ZERO TRANSITION REGION OF SUCH A DRIVE TRAIN ARRANGEMENT

(71) Applicant: Dr. Ing. h.c. F. Porsche Aktiengesellschaft, Stuttgart (DE)

(72) Inventors: Benjamin Blatter, Wiernsheim-Serres (DE); Dominik Kohl, Pforzheim (DE); Ulrich Franz Uhlirsch, Blaustein-Herrlingen (DE); Matthias Brandl, Rottenburg am Neckar (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 16/892,334

(22) Filed: Jun. 4, 2020

(65) Prior Publication Data

US 2020/0386283 A1    Dec. 10, 2020

(30) Foreign Application Priority Data

Jun. 5, 2019   (DE) ...................... 10 2019 115 113.9

(51) Int. Cl.
*F16D 48/08*       (2006.01)

(52) U.S. Cl.
CPC .... *F16D 48/08* (2013.01); *F16D 2500/10412* (2013.01)

(58) Field of Classification Search
CPC ........... F16D 48/08; F16D 2500/10412; F16H 2061/0087; F16H 2061/0459; F16H 57/12; F16H 2057/126
See application file for complete search history.

(56) References Cited

U.S. PATENT DOCUMENTS 5,679,091 A * 10/1997 Salecker ................. F16D 48/06
477/86
9,505,394 B2  11/2016 Falkenstein
2008/0048090 A1* 2/2008 Hirooka .................. F16H 57/12
248/664

(Continued)

FOREIGN PATENT DOCUMENTS

DE    102005041854 A1    12/2006
DE    102010062337 A1    6/2012

(Continued)

*Primary Examiner* — Edwin A Young
(74) *Attorney, Agent, or Firm* — Leydig, Voit & Mayer, Ltd,

(57) ABSTRACT

A drive train arrangement for a motor vehicle includes at least one drive device, a start-up element arrangement, a gear drive arrangement, at least one driveshaft configured to drive drive wheels, an electronic operator control member configured to be operated, a torque control member, and a controller. The controller is configured to store torque regions for a change in load and to transmit a torque default value to the torque control member depending on an actuation of the electronic operator control member. The stored torque regions are zero transition regions with a zero transition starting point and a zero transition end point for covering all zero-load clearance regions. The controller is configured to adapt at least one respective zero transition region of at least one respective stored torque region.

11 Claims, 2 Drawing Sheets

(56) References Cited

U.S. PATENT DOCUMENTS

| | | | | |
|---|---|---|---|---|
| 2011/0313636 A1* | 12/2011 | Uhlirsch | ............. | F02D 41/1497 |
| | | | | 701/102 |
| 2012/0017854 A1* | 1/2012 | Holscher | .................. | B60K 6/52 |
| | | | | 123/2 |
| 2013/0267382 A1* | 10/2013 | Inoue | ..................... | B60K 6/387 |
| | | | | 477/111 |
| 2020/0114913 A1 | 4/2020 | Cosfeld et al. | | |

FOREIGN PATENT DOCUMENTS

| | | |
|---|---|---|
| DE | 102013215937 A1 | 2/2015 |
| DE | 102015219181 A1 | 4/2017 |
| DE | 102012011756 B4 | 6/2017 |
| DE | 102017210075 A1 | 12/2018 |
| DE | 102017220031 A1 | 5/2019 |

\* cited by examiner

DRIVE TRAIN ARRANGEMENT FOR A MOTOR VEHICLE, AND METHOD FOR ADAPTING A ZERO TRANSITION REGION OF SUCH A DRIVE TRAIN ARRANGEMENT

CROSS-REFERENCE TO PRIOR APPLICATIONS

Priority is claimed to German Patent Application No. DE 10 2019 115 113.9, filed on Jun. 5, 2019, the entire disclosure of which is hereby incorporated by reference herein.

FIELD

The invention relates to a drive train arrangement for a motor vehicle, having at least one drive device, a start-up element arrangement, a gear drive arrangement, at least one driveshaft that drives drive wheels, an electronic operator control member to be operated, a torque control member, and a control unit, wherein torque regions for a change in load are stored in the control unit and the control unit transmits a torque default value to the torque control member depending on an actuation of the operator control member, wherein a torque region is defined as a zero transition region with a zero transition starting point and a zero transition end point for covering all zero-load clearance regions. The invention likewise relates to a method for adapting a zero-transition region of such a drive train arrangement.

BACKGROUND

Drive trains of this kind are well known from practice and the prior art. In more modern motor vehicles, a mechanical operator control member, for example a gas pedal, is replaced by an electronic pedal, wherein pedal actuation by the driver and the resultant driver demand torque is made available to the torque control member as a filtered driver demand torque, in order to bring about a new operating situation desired by the driver. In the event of a change from traction operation into overrun operation or vice versa, it is necessary, in motor vehicles having transmission or coupling elements between a torque source, such as the drive device, and the drive wheel, to pass through or shift through the zero-load clearance of the individual structural elements, such as gearwheel pairs, side shaft or two-mass flywheel. This can lead to an uncomfortable jolt and/or disturbing mechanical noises. The torque region in which this change is carried out is also referred to as the zero transition region or transient region.

In order to avoid this drawback, it is known to store the zero transition region having a zero transition starting point and a zero transition end point permanently in the control unit, wherein the drive rotational speed is filtered such that a hard impact between the structural elements does not occur at the end of the zero transition region. In order now to ensure that, throughout the service life of the motor vehicle, the physical zero transition end point for example does not occur earlier than the stored zero transition end point, the zero transition region is stored with a high safety factor in the control unit, this being at the expense of the dynamics in this torque region.

SUMMARY

In an embodiment, the present invention provides a drive train arrangement for a motor vehicle. The drive train arrangement includes at least one drive device, a start-up element arrangement, a gear drive arrangement, at least one driveshaft configured to drive drive wheels, an electronic operator control member configured to be operated, a torque control member, and a controller. The controller is configured to store torque regions for a change in load and to transmit a torque default value to the torque control member depending on an actuation of the electronic operator control member. The stored torque regions are zero transition regions with a zero transition starting point and a zero transition end point for covering all zero-load clearance regions. The controller is configured to adapt at least one respective zero transition region of at least one respective stored torque region.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
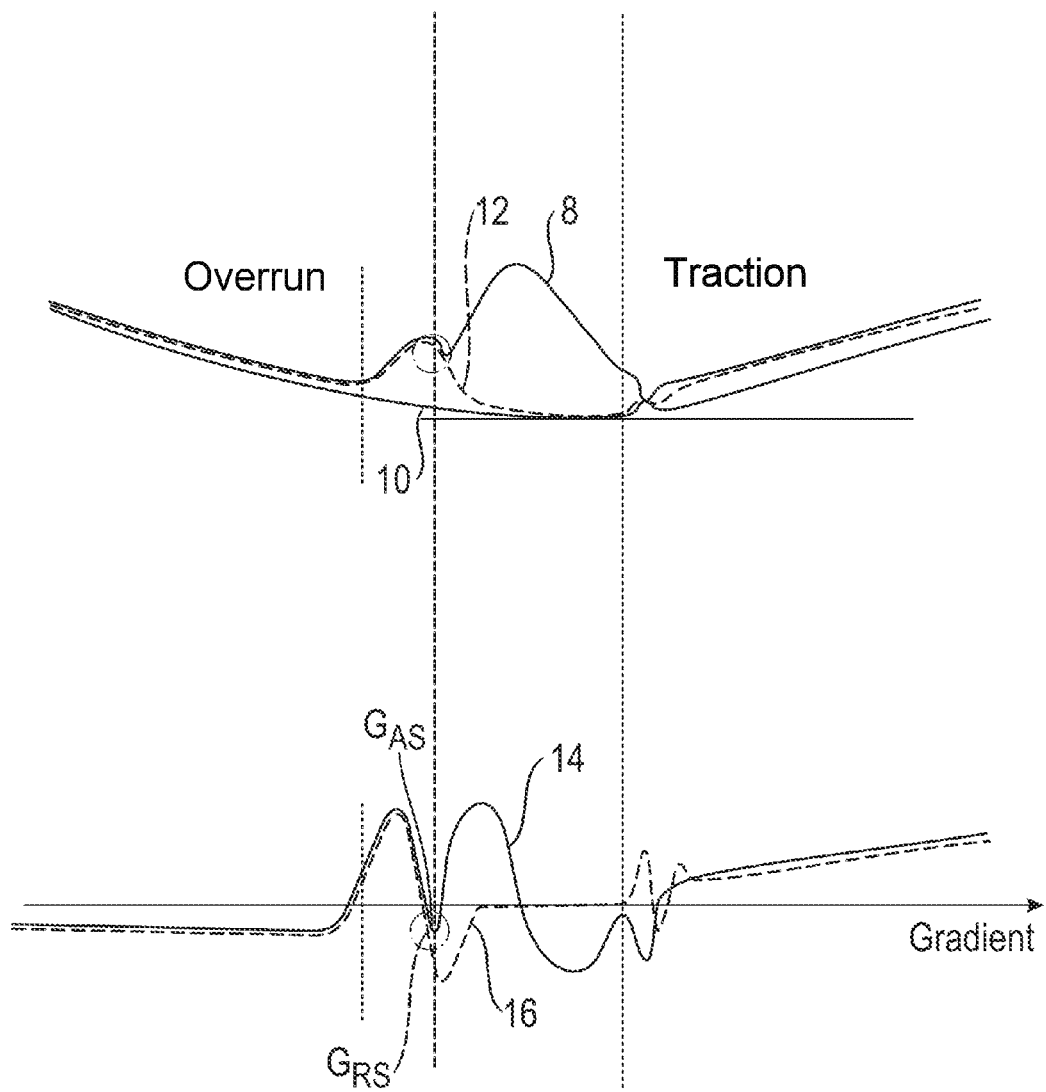
FIG. 1 shows a graph of different signal curves in a zero transition region against the background of a first regulating method.

The present disclosure describes a drive train arrangement and a method, which avoid the abovementioned drawback. In a drive train arrangement according to the invention, a control unit is provided having control means by which the zero transition region is adaptable. This results in a considerable dynamics advantage, since too large a zero transition region causes a delay in the torque build-up. In a particularly advantageous embodiment, the zero transition starting point and/or the zero transition end point should be defined flexibly in the control unit by means of at least one regulating method stored in the control unit.

In this case, a first defines, as a first adaptation value, the zero transition starting point on the basis of a comparison of a gradient of the rotational speed of the drive device at the point $G_{AS}$ with a gradient of the rotational speed of a drive wheel at the point $G_{RS}$ depending on a threshold to be exceeded.

A second regulating method advantageously defines, as a second adaptation value, the zero transition end point on the basis of a comparison of the gradient of the setpoint rotational speed of the drive device at the point $G_{AES}$ with the gradient of the actual rotational speed of the drive device at the point $G_{AEI}$ or of a comparison of the setpoint rotational speed with the actual rotational speed of the drive wheel, or of a comparison of the gradient of the actual rotational speed of the drive device with a threshold value, or of a comparison of the gradient of the change in actual rotational speed of the drive wheel or of the gradient of the actual rotational speed of the drive wheel with a threshold value.

Furthermore, a third regulating method can adapt, as third adaptation value, the length of a zero transition angle of the zero transition region. All three regulating methods can be used separately or together, depending on the particular concept of the change in load. This results in a considerable dynamics advantage, which is maintained over the service life of the motor vehicle.

Advantageously, each particular adaptation value should be weighted on the basis of the difference in the gradients and/or the previous frequency, thereby allowing more accurate derivation of the zero transition region.

The disclosure further describes a method for adapting a zero transition region in such a drive train arrangement, wherein the zero transition starting point and/or a zero transition end point and/or the length of a transition angle is/are adapted. In this case, in an advantageous embodiment, the zero transition starting point is adapted in that the gradient of the rotational speed of the drive device at the point $G_{AS}$ is compared with the gradient of the rotational speed of a drive wheel at the point $G_{RS}$ depending on a threshold, a separation point is determined, the separation point is stored in the control unit, and the zero transition starting point is adapted if necessary.

It is also possible for the zero transition end point to be adapted in that the gradient of the setpoint rotational speed of the drive device at the point $G_{AES}$ is compared with the gradient of the actual rotational speed of the drive device at the point $G_{AEI}$ or the setpoint rotational speed is compared with the actual rotational speed of the drive wheel, or the gradient of the actual rotational speed of the drive device is compared with a threshold value, or the gradient of the change in actual rotational speed of the drive wheel or the gradient of the actual rotational speed of the drive wheel is compared with a threshold value, an engagement point is determined, the engagement point is stored in the control unit, and the zero transition end point is adapted if necessary.

Furthermore, it is possible for the length of a zero transition angle of the zero transition region to be adapted in that physical engagement of tooth flanks of the gear drive arrangement is determined and is compared with the stored zero transition end point such that the zero transition end point is adapted if necessary.

Here too, it is advantageous for each particular adaptation to be weighted on the basis of the difference in the gradients and the previous frequency.

FIG. 1 shows a signal curve for a zero transition region 2 with a zero transition starting point 1' and a zero transition end point 3, at which the load cycle changes from overrun to traction on account of a driver demand. The curve 4 illustrates the unfiltered torque on account of a driver demand. The curve 6 shows the filtered torque to be triggered by a torque control member. The curve 8 indicates a rotational speed of a drive device, the curve 10 a rotational speed of a drive wheel, and the curve 12 a reference speed of the drive wheel that has been corrected by the elastic bracing of the drive train for comparison. The curve 14 then indicates a gradient $G_A$ of the rotational speed of the drive device and the curve 16 a gradient $G_R$ of the standardized rotational speed of the drive wheel. At the point $G_{AS}$, $G_{RS}$, the gradient $G_R$ separates from the gradient $G_A$, and this should be classified as the actual zero transition starting point. On this basis of this finding, this zero transition starting point can then be stored in the control unit as a new zero transition starting point 1", in order to adapt subsequent zero transition regions 2.

Figure 2:
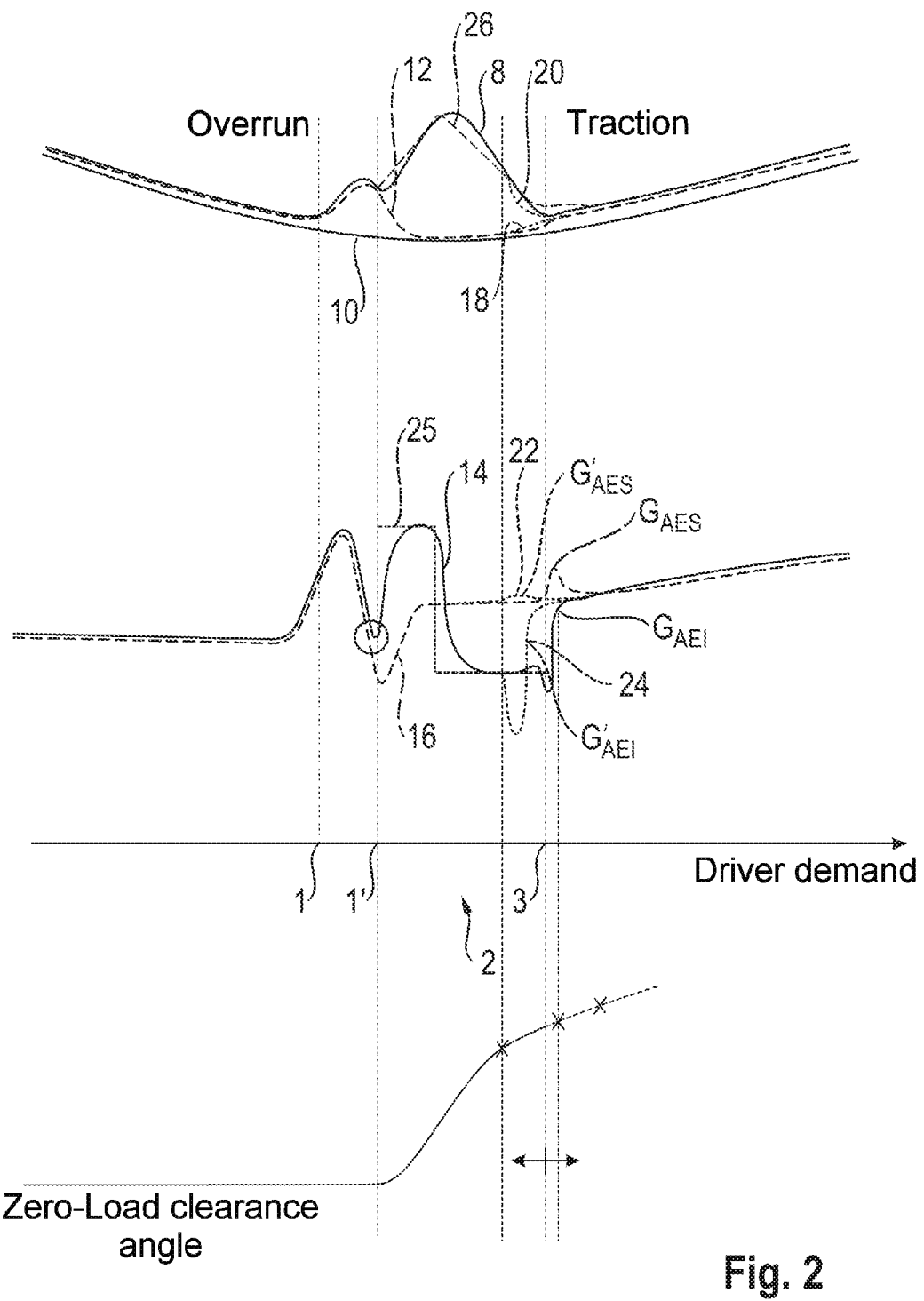
FIG. 2 shows a graph of different signal curves against the background of a second regulating method.

FIG. 2 shows a second signal curve, which illustrates a second regulating method. The curves 4, 6, 8, 10, 12, 14 and 16 correspond to the curves in FIG. 1. The dotted lines 18, 20 and 22, 24 illustrate changes in the respective rotational speeds and gradients, respectively, which can have different effects on the zero transition end point to be adapted.

In a first operating situation, illustrated by the lines 8, 10, 12, the implemented zero transition region is greater than the zero transition region 2 stored in the control unit. The zero transition region 2 should be enlarged by shifting the zero transition end point 3, wherein the reaction of the motor vehicle immediately after the regulating operation should be monitored. This too small zero transition region 2 is identified by a comparison of the gradient 25 of the setpoint rotational speed of the drive device at the point $G_{AES}$ with the gradient 14 of the actual rotational speed of the drive device at the point $G_{AEI}$. Alternatively, a comparison of the setpoint rotational speed with the actual rotational speed of the drive wheel can be made, or the gradient of the actual rotational speed of the drive device can be compared with a threshold value, or the gradient of the change in the actual rotational speed of the drive wheel or the gradient of the actual rotational speed of the drive wheel can be compared with a threshold value.

The line 20 illustrates a modified curve 8, with the result that the zero transition region stored in the control unit was chosen to be too large compared with the implemented zero transition region. The physical zero transition region is thus smaller than the stored zero transition region. This is an indication of impact between the tooth flanks, with the result that the zero transition region is terminated early. This too is detected by a comparison of a point $G'_{AES}$ of the setpoint rotational speed of the drive device with a point $G'_{AEI}$ of the actual rotational speed of the drive device or by a comparison of the setpoint rotational speed with the actual rotational speed of the drive wheel, or a comparison of the gradient of the actual rotational speed of the drive device with a threshold value, or a comparison of the gradient of the change in the actual rotational speed of the drive wheel or the gradient of the actual rotational speed of the drive wheel with a threshold value are compared and then adapted.

The line 18 illustrates a modified curve 10, wherein the rotational speed of the drive wheel and thus the gradient $G_R$ changes without the gradient of the rotational speed of the drive device $G_A$ deviating from the setpoint curve 14. The regulating operation is ended since the drive train has been safely shifted over. The shifting over of the drive train has taken place without the tooth flanks of a drive side impacting the tooth flanks of an output side before the stored zero transition end point has been reached. The zero transition end point does not need to be adapted. There is no need for regulating in this operating situation.

If adaptation of the zero transition region on the basis of the abovementioned method is not possible or needs to be additionally supported, the length of the zero transition region can be determined by means of the calculation of a theoretically passed-through torsion angle. Previously adapted values can also be used. The theoretically passed-through torsion angle can be determined by means of a calculated differential rotational speed, which can be calculated via a differential torque and mass moment of inertia of the drive device starting from the torque at the adapted start of the zero transition region.

In all regulating methods, the particular adaptation can be weighted on the basis of the difference between the gradients (drive train reaction) and the previous frequency.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A drive train arrangement for a motor vehicle, comprising:
   at least one drive device;
   a start-up element arrangement;
   a gear drive arrangement;
   at least one driveshaft configured to drive wheels;
   an electronic operator control member configured to be operated;
   a torque control member; and
   a controller, wherein the controller is configured to store torque regions for a change in load and to transmit a torque default value to the torque control member depending on an actuation of the electronic operator control member,
   wherein the stored torque regions are zero transition regions with a zero transition starting point and a zero transition end point for covering all zero-load clearance regions, and
   wherein the controller is configured to adapt at least one respective zero transition region of at least one respective stored torque region.

2. The drive train arrangement as claimed in claim 1, wherein the controller is configured to flexibly define the respective zero transition starting point and/or the respective zero transition end point of the at least one respective stored torque region by at least one regulating method stored in the controller.

3. The drive train arrangement as claimed in claim 2, wherein the at least one regulating method stored in the controller comprises a first regulating method that defines, as a first adaptation value, the respective zero transition starting point based on a comparison of a gradient of the rotational speed of the drive device at the point $G_{AS}$ with a gradient of the rotational speed of a drive wheel at the point $G_{RS}$.

4. The drive train arrangement as claimed in claim 3, wherein the at least one regulating method stored in the controller further comprises a second regulating method that defines, as a second adaptation value, the zero transition end point based on a comparison of a gradient of a setpoint rotational speed of the drive device at the point $G_{AES}$ with a gradient of an actual rotational speed of the drive device at the point $G_{AEI}$ or of a comparison of the setpoint rotational speed with the actual rotational speed of the drive wheel, or of a comparison of the gradient of the actual rotational speed of the drive device with a threshold value, or of a comparison of the gradient of the change in actual rotational speed of the drive wheel or of the gradient of the actual rotational speed of the drive wheel with a threshold value.

5. The drive train arrangement as claimed in claim 4, wherein the at least one regulating method stored in the controller further comprises a third regulating method that adapts, as third adaptation value, a length of a zero transition angle of the respective zero transition region.

6. The drive train arrangement as claimed in claim 2, wherein each adaptation value is weighted based on a difference in gradients and/or a previous frequency.

7. A method for adapting a zero transition region of a drive train arrangement as claimed in claim 1, wherein the zero transition starting point and/or the zero transition end point and/or a length of a zero transition angle is/are adapted.

8. The method for adapting a zero transition region as claimed in claim 7, wherein the zero transition starting point is adapted in that a gradient of the rotational speed of the drive device at a point $G_{AS}$ is compared with a gradient of the rotational speed of a drive wheel at a point $G_{RS}$, a separation point is determined, the separation point is stored in the controller, and the zero transition starting point is adapted if necessary.

9. The method for adapting a zero transition region as claimed in claim 7, wherein the zero transition end point is adapted in that a gradient of a setpoint rotational speed of the drive device at a point $G_{AES}$ is compared with a gradient of the actual rotational speed of the drive device at a point $G_{AEI}$ or the setpoint rotational speed is compared with the actual rotational speed of the drive wheel, or the gradient of the actual rotational speed of the drive device is compared with a threshold value, or the gradient of the change in actual rotational speed of the drive wheel or the gradient of the actual rotational speed of the drive wheel is compared with a threshold value, an engagement point is determined, the engagement point is stored in the control unit, and the zero transition end point is adapted if necessary.

10. The method for adapting a zero transition region as claimed in claim 7, wherein a length of a zero transition angle of the zero transition region is adapted in that physical engagement of tooth flanks of the gear drive arrangement is determined and is compared with a stored zero transition end point such that the zero transition end point is adapted if necessary.

11. The method for adapting a zero transition region as claimed in claim 7, wherein each particular adaptation is weighted based on a difference in the gradients and the previous frequency.

* * * * *